(12) United States Patent
Gilch et al.

(10) Patent No.: US 6,829,945 B2
(45) Date of Patent: Dec. 14, 2004

(54) SENSOR DEVICE FOR REGISTERING STRAIN

(75) Inventors: Markus Gilch, Mauern (DE); Anton Grabmaier, Zeitlarn (DE); Leif Reinhold, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/196,557

(22) Filed: Jul. 17, 2002

(65) Prior Publication Data
US 2003/0024322 A1 Feb. 6, 2003

(30) Foreign Application Priority Data
Jul. 17, 2001 (DE) .......................... 101 34 586

(51) Int. Cl.⁷ ............... G01L 1/00; G01B 7/16
(52) U.S. Cl. .................... 73/777; 73/862.381
(58) Field of Search ............ 73/777, 775, 862.381, 73/862.391, 862.42, 862.451, 862.471

(56) References Cited

U.S. PATENT DOCUMENTS

| | | | | |
|---|---|---|---|---|
| 3,624,714 A | * | 11/1971 | Frassrand | 73/148 |
| 4,840,067 A | * | 6/1989 | Nishida et al. | 73/726 |
| 4,994,781 A | * | 2/1991 | Sahagen | 338/47 |
| 5,412,994 A | * | 5/1995 | Cook et al. | 73/756 |
| 5,422,513 A | * | 6/1995 | Marcinkiewicz et al. | 257/668 |
| 6,341,528 B1 | * | 1/2002 | Hoffman et al. | 73/777 |
| 6,521,966 B1 | * | 2/2003 | Ishio et al. | 257/417 |

* cited by examiner

*Primary Examiner*—Edward Lefkowitz
*Assistant Examiner*—Lilybett Martir
(74) *Attorney, Agent, or Firm*—Morrison & Foerster LLP

(57) ABSTRACT

A sensor device for registering strain of a component, which comprises a sensor chip and a supporting substrate, which are connected to each other by a connecting layer such that they form a prefabricated sensor module. The sensor module is attached to the component by a durable creep-free connection such that the strain of the component is transferred to the sensor chip.

17 Claims, 1 Drawing Sheet

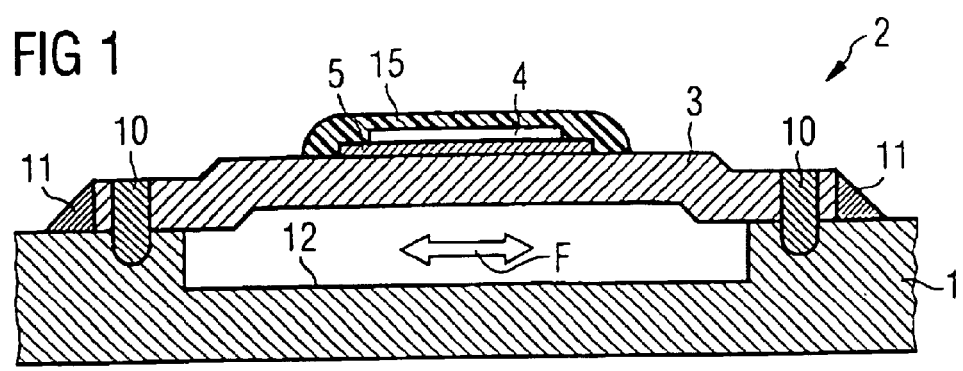
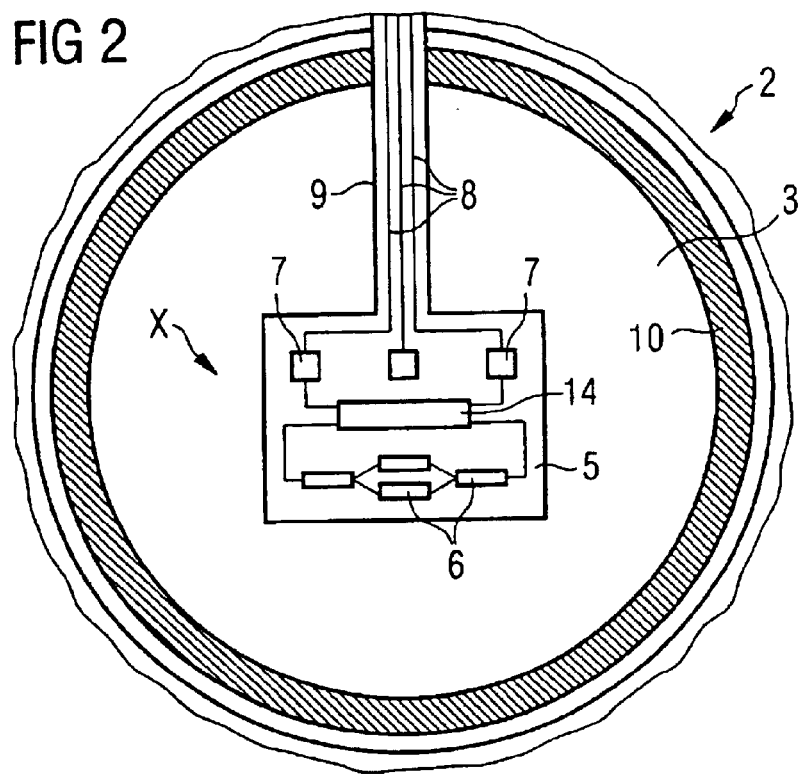
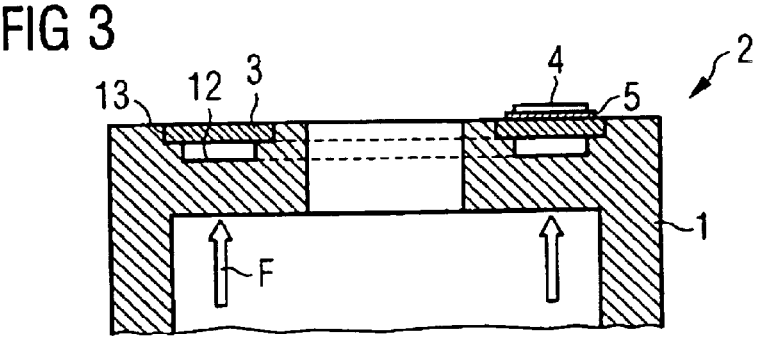

SENSOR DEVICE FOR REGISTERING STRAIN

CLAIM FOR PRIORITY

This application claims priority of Germany application 10134586.0 filed on Jul. 17, 2001.

TECHNICAL FIELD OF THE INVENTION

The present invention relates to a sensor device for registering strain of a component.

BACKGROUND OF THE INVENTION

There are numerous known methods for registering strain of a component, as induced by tensile, compressive, flexural and/or torsional forces. For example, for measuring the stress and strain on components subjected in particular to axial stress, such as pipes and bars, the strain is measured on the outer wall by means of strain gages. To achieve adequate signal strength and resolution, the cross section of the wall of the component is usually reduced in the measuring region in such a way that an elongation of 0.05 to 0.1% is achieved. Known examples are metal-film strain gages on a film of plastic, thin-film strain gages on steel, thick-film strain gages on steel or ceramic and magnetoresistive sensors. Even though all of these methods have their advantages, they also suffer from one or more disadvantages: disadvantages of metal-film strain gages on a film of plastic are creep of the adhesive, low endurance, high current consumption and difficult application. Thin-film strain gages on steel have the disadvantage of high production costs and complex contacting. Thick-film strain gages on steel or ceramic have only a low measuring accuracy and a short service life and, moreover, are suitable only for few grades of steel. In the case of magnetostrictive sensor devices, the measuring accuracy and service life are impaired by thermal influences and changes in the magnetic properties of the base body.

In general, it can be stated that the conventional sensor devices for registering strains do not satisfy the requirements in terms of measuring accuracy, service life, temperature independence and production and assembly costs that are appropriate for many intended applications.

DE 198 33 712 A1 discloses a pressure sensor device with a sensor chip which rests on a monolithically integrated structure. The sensor chip contains a plurality of sensor elements connected together in a measuring bridge and an analog or digital circuit required for the signal evaluation. The component to be measured is formed as a diaphragm body with a metal diaphragm, which is exposed on one side to the pressure medium and on the other side of which the sensor chip is attached by a glass of a low melting point, adhesive or the like. The strain of the metal diaphragm caused by the pressure of the pressure medium is registered by the sensor chip, to generate from this an electrical signal for the pressure to be measured. It is disadvantageous that the production of the metal diaphragm on the measuring body requires corresponding effort. In addition, the attachment of the silicon sensor chip on the metal diaphragm involves considerable difficulties. With adhesives in particular, it is not possible for the sensor chip to be mounted on the metal diaphragm without any creep and with long-term stability. In addition, the calibration of the sensor chip attached to the metal diaphragm requires considerable effort.

SUMMARY OF THE INVENTION

In one embodiment of the present invention, a sensor device is provided for registering strain of a component which, in spite of lowest possible production and assembly costs, has a high measuring accuracy over a relatively large temperature range and a long service life. In particular, it is intended to be suitable for use in the motor vehicle sector.

In an embodiment of the present invention, a sensor device comprises a sensor chip and a supporting substrate, which are connected to each other durably and without creep such that the sensor chip, the supporting substrate and the connecting layer form a prefabricated sensor module. The sensor module can be attached to the component to be measured by a durable and creep-resistant connection such that the strain of the component is transferred from the supporting substrate to the sensor chip, which then generates a corresponding electrical output signal.

In a preferred embodiment of the present invention, the sensor chip has a small thickness of about, for example, 20 to 100 $\mu$m. It is applied by a connecting process, such as for example glass or AuSn soldering, to the supporting substrate, which includes for example of steel or an NiFeCo alloy. This produces a sensor module in the form of a very stable layered structure which forms a functional unit with long-term stability, no creep and little hysteresis.

In one aspect of the invention, this functional unit permits a high measuring accuracy (of for example 0.25%) over a relatively great temperature range (of for example −40 to +140° C.), has a long service life, is inexpensive to produce and can be mounted in a simple way on the component to be measured, and can be calibrated already before it is attached to the component to be measured.

BRIEF DESCRIPTION OF THE DRAWINGS

Exemplary embodiments of the invention are described in more detail on the basis of the drawings, in which:

FIG. 1 shows a cross section through a sensor module which is attached to a component to be measured.

FIG. 2 shows a plan view of the sensor module in FIG. 1.

FIG. 3 shows a sectional view of a modified embodiment of a sensor module which is attached to a differently designed component.

DETAILED DESCRIPTION OF THE PREFERRED EMBODIMENTS

The sensor device represented in FIG. 1 serves for registering the strain of a component 1, of which a wall portion is represented. The component 1 may be, for example, an axially stressed component, such as a pipe or a bar. However, other components, in which the strain is induced by tensile, compressive, flexural or torsional forces, are also conceivable. In FIG. 1, the flux of force which induces a strain in the component 1 is indicated by an arrow F.

The sensor device is formed by a sensor module 2, which is configured as a functional unit and comprises a supporting substrate 3, a sensor chip 4 and a connecting layer 5. The sensor, module 2 comprising the supporting substrate 3, sensor chip 4 and connecting layer 5 has a stable layered structure, as explained in further detail below.

The sensor chip 4 is preferably a silicon semiconductor chip resting on a monolithically integrated structure, with a plurality of piezoresistive sensor elements 6 (see FIG. 2), connected together to form a measuring bridge, and an analog or digital circuit 14, required for the signal evaluation, with terminals 7. The sensor chip 4 is capable of registering strain by converting the difference between two mechanical stresses into an electrical output signal. Since the basic structure of the sensor chip required for this purpose is known, it is not explained any further. However, it must be emphasized that the sensor chip 4 expediently has a very small thickness, which is of the order of magnitude of about 20 to 100 μm.

The supporting substrate 3 and also the connecting layer 5 comprise a material which has a stress-strain relationship in the range of Hook's law, to allow it to transfer the strain of the component 1 to the sensor chip 4. To be more precise, the supporting substrate 3 comprises a material which has a coefficient of expansion of the order of 4 to 8 times $10^{-6}$ per ° Kelvin. Grades of steel with precipitation hardening agents and also nickel-iron-cobalt alloys come into consideration for example. However, other corresponding materials are also conceivable.

If the sensor chip 4 has a thickness of the order of about 80 to 100 μm, the coefficient of expansion of the supporting substrate 3 should be similar to that of silicon. If, however, the sensor chip 4 has a still smaller thickness, for example in the range of about 20 to 30 μm or less, a corresponding adaptation of the coefficient of expansion of the supporting substrate 3 to that of the silicon sensor chip 4 is not required. The supporting substrate 3 and the sensor chip 4 can then have coefficients of expansion that are significantly different from each other.

The connecting layer 5 connecting the sensor chip 4 to the supporting substrate 3 is produced by a durable, creep-free connecting process used in electronic or semiconductor production. Glass or AuSn soldering, or else a eutectic alloying process with an AuSi alloy, come into consideration for example. The material of the connecting layer 5 ideally has a coefficient of expansion which lies between those of the supporting substrate 3 and of the sensor chip 4.

In this way, the sensor module 2 is provided with a very stable layered structure which forms a functional unit with long-term stability, little to no creep and little hysteresis. The supporting substrate 3 is of plate-like shape of substantially uniform thickness and has a round outline as represented in FIG. 2.

The prefabricated sensor module 2 is attached to the component 1 by a durable, creep-free connecting process such that the strain of the component 1 is transferred directly to the supporting substrate 3 and from there via the connecting layer 5 to the sensor chip 4. A preferred connecting process is laser welding. However, capacitor discharge welding and other connecting processes also come into consideration. Corresponding welds 10 are schematically represented in FIGS. 1 and 2. In addition to the welds 10, welds 11 in the form of fillet welds may also be provided, correspondingly increasing the dimensional and long-term stability of the connection between the sensor module 2 and the component 1.

The supporting substrate 3 is attached to the component 1 in as close contact as possible, such that, apart from regions in which it has a bottom surface in contact with a top surface of the component 1 for being welded to the component 1, it is at a distance from the component 1. As represented in FIG. 1, this can be achieved by a recess 12 in the component 1 and/or by a cranked form of the supporting substrate 3. The cranked form of the supporting substrate 3 represented in FIG. 1 additionally has the advantage that the supporting substrate 3 cannot be deflected upward or downward on account of great temperature differences (avoidance of undefined buckling). However, it goes without saying that the supporting substrate 3 may also have a planar form, if appropriate spacing in the region of the supporting substrate 3 undergoing strain is ensured by a recess 12 in the component 1.

As indicated in FIG. 2, in principle three electrical leads 8 are required, to be precise for voltage, ground and signal information. The electrical leads 8 may be laid onto the supporting substrate 3. In the exemplary embodiment represented, this takes place by means of a flexible printed circuit board 9, which is, for example, adhesively mounted on the supporting substrate 3. The connection between the electrical leads 8 and the terminals 7 expediently takes place by wire bonds. The sensor chip 4 and the bonding contacts are subsequently covered with a soft encapsulating compound (FIG. 1). The encapsulating compound should be soft in order that no mechanical stresses in the region of the electrical leads influence the properties of the supporting substrate 3.

The sensor module 2 may be subjected to tensile, compressive, flexural or torsional stress. FIG. 3 shows an exemplary embodiment in which a component 1 in the form of a tubular body is subjected to an axial force, as indicated by the arrows F. Furthermore, in FIG. 3 the supporting substrate 3 is designed in the form of an annular disk, which has been fitted into a corresponding annular groove 13 in the component 1. The annular groove 13 is adjoined by an annular recess 12 in the component 1, achieving the spacing between the supporting substrate 3 and the component 1.

Numerous modified embodiments both of the supporting substrate 3 and of the component 1 to be measured are conceivable. The sensor module 2 can in any event be attached to surfaces to be measured that are designed in virtually any desired shape or form. In the case of an uneven flux of force on the component to be measured 1, it is also possible for a plurality of sensor modules to be provided, to obtain an averaged signal.

The sensor module 2 represented can consequently be used for measuring a large number of mechanical stresses of the component, such as for example tensile and compressive force, strain, average flow pressure, torque, etc. The sensor module 2 can then be respectively set in a dedicated calibrating device to the variable to be measured. The calibration can be performed either before or after the attachment of the sensor module 2 to the component 1. The calibration can in this case take place by the output signal having the necessary gain and linearity, even with respect to the temperature. If the sensor module 2 is calibrated before it is mounted on the component 1, this can be carried out in a dedicated calibrating device similar to a tensile testing machine. Mounting-related stresses of the sensor module 2 can then be corrected after mounting by a zeroing of the sensor chip 4 by means of suitable software in the downstream system electronics. In the case of calibration on the already mounted sensor module 3, the communication required for the calibration takes place directly with the sensor chip 4 via the three terminals 8.

What is claimed is:

1. A sensor device for registering strain of a component, comprising:

a sensor chip including a plurality of electrically connected sensor elements and a circuit required for signal evaluation;

a supporting substrate of a round or annular outline to receive the sensor chip; and a connecting layer, which connects the sensor chip to the supporting substrate durably and without creep so that the sensor chip, the supporting structure, and the connecting layer form a prefabricated sensor module, wherein the supporting substrate is of plate-like shape of substantially uniform thickness and having a bottom surface in contact with a top surface of the component for being attached to the component durably and without creep so as to transfer the strain of the component to the sensor chip.

2. The sensor device as claimed in claim 1, wherein the thickness of the sensor chip is between about 20 and 100 $\mu$m.

3. The sensor device as claimed in claim 2, wherein the thickness of the sensor chip is between about 80 and 100 $\mu$m.

4. The sensor device as claimed in claim 2, wherein the thickness of the sensor chip is between about 20 and 30 $\mu$m.

5. The sensor device as claimed in claim 1, wherein material forming the supporting substrate has a coefficient of expansion similar to silicon.

6. The sensor device as claimed in claim 1, wherein the supporting substrate comprises steel or a nickel-iron-cobalt alloy.

7. The sensor device as claimed in claim 1, wherein the connecting layer has a coefficient of expansion which is between silicon and the supporting substrate.

8. The sensor device as claimed in claim 1, wherein the connecting layer is produced by glass or gold-tin soldering or a eutectic alloying process.

9. The sensor device as claimed in claim 1, wherein the supporting substrate has a planar form.

10. The sensor device as claimed claim 1, wherein the supporting substrate has a cranked form.

11. The sensor device as claimed in claim 1, wherein the sensor module is configured for attachment to the component by laser or capacitor discharge welding.

12. The sensor device as claimed claim 1, wherein the supporting substrate is configured for attachment to the component such that it is subjected to tensile, compressive, flexural or torsional stress.

13. The sensor device as claimed in claim 1, wherein the sensor module is calibrated before or after attachment to the component.

14. The sensor device as claimed in claim 1, wherein the supporting substrate bears electrical leads of the sensor chip.

15. The sensor device as claimed in claim 14, wherein the electrical leads are configured as electrical interconnects, which are connected to the sensor chip by terminals configured as bonding contacts.

16. The sensor device as claimed in claim 15, wherein the sensor chip and the terminals are covered by a soft encapsulating compound.

17. A sensor device for registering strain of a component, comprising:

a sensor chip including a plurality of electrically connected sensor elements and a circuit required for signal evaluation;

a supporting substrate of a round or annular outline to receive the sensor chip; and a connecting layer, which connects the sensor chip to the supporting substrate durably and without creep so that the sensor chip, the supporting structure, and the connecting layer form a prefabricated sensor module, wherein the supporting substrate is of plate-like shape of substantially uniform thickness and having a bottom surface in contact with a top surface of the component for being attached to the component durably and without creep so as to transfer the strain of the component to the sensor chip, wherein the supporting substrate and the component are of shapes such that when they are attached to each other, the bottom surface of the substrate and the top surface of the component are spaced from each other except at a region of contact.

* * * * *